(12) United States Patent
Crawley et al.

(10) Patent No.: US 8,190,139 B2
(45) Date of Patent: May 29, 2012

(54) TELEMATICS SYSTEM AND METHOD OF COMMUNICATION

(75) Inventors: Casimir Johan Crawley, Carmel, IN (US); Alan Lee Strader, Noblesville, IN (US)

(73) Assignee: Delphi Technologies, Inc., Troy, MI (US)

( * ) Notice: Subject to any disclaimer, the term of this patent is extended or adjusted under 35 U.S.C. 154(b) by 985 days.

(21) Appl. No.: 12/218,711

(22) Filed: Jul. 17, 2008

(65) Prior Publication Data

US 2009/0054049 A1 Feb. 26, 2009

Related U.S. Application Data

(60) Provisional application No. 60/957,780, filed on Aug. 24, 2007.

(51) Int. Cl.
*H04M 3/00* (2006.01)
(52) U.S. Cl. ................................ 455/418; 703/13
(58) Field of Classification Search .......... 455/418–420; 703/13–22; 714/25–38
See application file for complete search history.

(56) References Cited

U.S. PATENT DOCUMENTS

| | | | |
|---|---|---|---|
| 6,895,519 B2* | 5/2005 | Endo | 713/322 |
| 7,730,545 B2* | 6/2010 | Milne et al. | 726/27 |
| 2005/0049847 A1* | 3/2005 | Miyamoto et al. | 703/22 |
| 2007/0214389 A1* | 9/2007 | Severson et al. | 714/30 |

OTHER PUBLICATIONS

IEEE Std. 1149.1-1990: IEEE Standard Test Access Port and Boundary-Scan Architecture, Institute of Electrical and Electronics Engineers, Inc.
Applicantions Note 28: The ARM7TDMI Debug Architecture, Advanced RISC Machines (ARM) Ltd.
IEEE Std. 1149.1-2001: IEEE Standard Test Access Port and Boundary-Scan Architecture, Institute of Electrical and Electronics Engineers, Inc.
IEEE Std. 1149.1b-1994: Supplemental to IEEE Std 1149.1-1990, Standard Test Access Port and Boundary-Scan Architecture, Institute of Electrical and Electronics Engineers, Inc.
User Manual: bdiGDB JTAG interface for GNU Debugger, BDI2000 (ARM), Abatron AG, V 1.20.

\* cited by examiner

*Primary Examiner* — Kent Chang
*Assistant Examiner* — Kashif Siddiqui
(74) *Attorney, Agent, or Firm* — Lawrence D. Hazelton

(57) ABSTRACT

A telematics system and method is provided, wherein the telematics system includes a processor having a core, a cell in communication with the core, and an applications processor in communication with the mobile processor. The system further includes at least one communication channel in communication between the mobile processor and the applications processor, wherein the mobile processor and the applications processor communicate data over the at least one communication channel during normal operation of a telematics system, and the mobile processor and applications processor communicate data over the at least one communication channel when the telematics system is at least one of being developed and manufactured.

18 Claims, 5 Drawing Sheets

TELEMATICS SYSTEM AND METHOD OF COMMUNICATION

CROSS-REFERENCE TO RELATED APPLICATION

This application claims the benefit under 35 U.S.C. §119 (e) of U.S. Provisional Patent Application No. 60/957,780, filed on Aug. 24, 2007, the entire disclosure of which is hereby incorporated herein by reference.

TECHNICAL FIELD

The present invention generally relates to a telematics system and method, and more particularly, to a telematics system and method using a debugging bus for non-debugging communications.

BACKGROUND OF THE INVENTION

Generally, telematics are the integrated use of telecommunications and informatics, wherein data is transmitted, received, and stored via telecommunication devices. Typically, telematics devices have two processors, such that an applications processor performs telematics application tasks, while interfacing with another wireless processor performing wireless tasks. Generally, the applications processor is a general purpose system-on-chip (SOC) that supports multiple industry-standard inter-processor serial busses. Typically, the wireless processor is a wireless mobile application-specific integrated circuit (ASIC).

Generally, the ASICs provide a universal asynchronous receiver transmitter (UART) for temporary debugging or firmware upgrading communications. When UARTs are used for permanent high-speed serial inter-processor communications, mismatched baud rates during the use of the UART can typically result from incompatible clock division, clock drift, incompatible crystal frequencies, or noise, which negatively impact such communications.

SUMMARY OF THE INVENTION

According to one aspect of the present invention, a telematics system includes a mobile processor having a core, a cell, and an applications processor in communication with the mobile processor. The telematics system further includes at least one communication channel in communication between the mobile processor and the applications processor, wherein the mobile processor and the applications processor communicate data over the at least one communication channel during normal operation of a telematics system, and the mobile processor and applications processor communicate data over the at least one communication channel when the telematics system is at least one of developed and manufactured.

According to another aspect of the present invention, a telematics system includes a mobile processor having an ARM core, an EmbeddedICE macrocell in communication with the ARM core, and a test access port (TAP) controller in communication with the EmbeddedICE macrocell. The EmbeddedICE macrocell includes a debug communications data register configured to store data, and a debug communications control register having first and second bits, wherein data is at least one of written to or read from the debug communications data register based upon a status of at least one of the first and second bits. The telematics system further includes an applications processor in communication with the mobile processor, and a plurality of communication channels in communication between the mobile processor and the applications processor, wherein the mobile processor and the applications processor communicate data over at least a portion of the plurality of communication channels during normal operation of a telematics system, and the mobile processor and the applications processor communicate data over at least a portion of the plurality of communication channels when the telematics system is at least one of developed and manufactured.

According to yet another aspect of the present invention, a method of communicating between the processors in the telematics system includes the steps of providing a plurality of communication channels between a first and a second processor for communicating data during normal operation of a telematics system, and communicating debugging data when the telematics system is at least one of developed and manufactured, wherein the first processor includes a plurality of registers. The method further includes the steps of writing data to a first register of the plurality of registers by a core if a first bit in a second register of the plurality of registers is a predetermined value, writing data to a first register by the second processor if a second bit of the second register of the plurality of registers is a predetermined value, reading data from the first register by the core if the second bit is a predetermined value, and reading data from the first register by the second processor if the first bit is a predetermined value.

These and other features, advantages and objects of the present invention will be further understood and appreciated by those skilled in the art by reference to the following specification, claims and appended drawings.

BRIEF DESCRIPTION OF THE DRAWINGS

The present invention will now be described, by way of example, with reference to the accompanying drawings, in which.

DESCRIPTION OF PREFERRED EMBODIMENT

Figure 1:
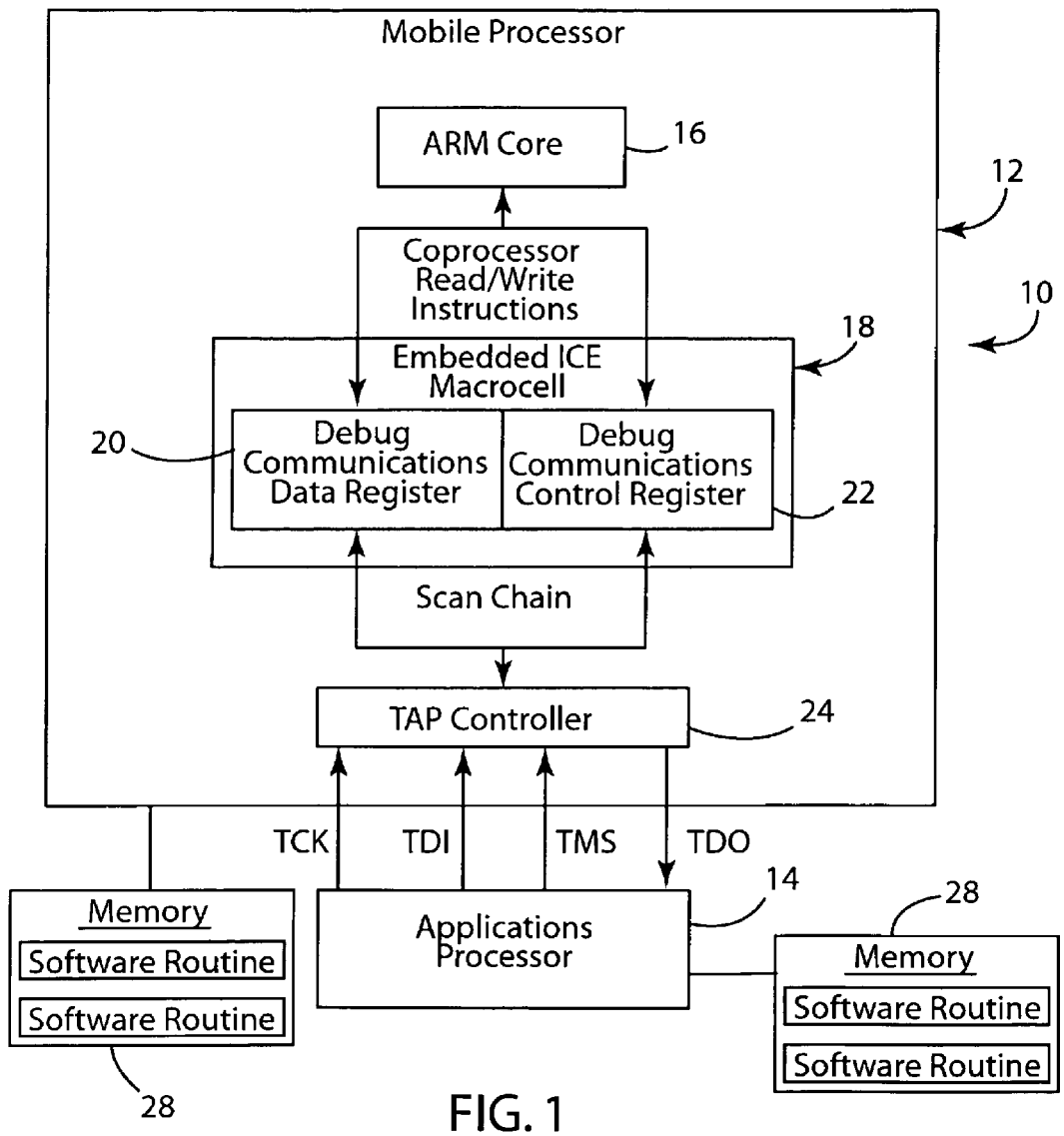
FIG. 1 is a block diagram illustrating a telematics system having two processors, in accordance with one embodiment of the present invention.

In reference to FIG. 1, a telematics system is generally shown at reference identifier 10. The telematics system 10 includes a plurality of processors including a first processor or mobile processor generally indicated at reference identifier 12 and a second processor or applications processor 14. According to one embodiment, the mobile processor 12 is an application-specific integrated circuit (ASIC), and the mobile processor 12 and applications processor 14 communicate data through at least one pin or channel during normal operation of the telematics system 10. In such an embodiment, the at least one pin or channel that is used for communicating data between the processors 12,14 are used for debugging during the development and/or manufacturing process of the telematics system 10, as described in greater detail herein. In such an embodiment, this can apply mainly to normal operation and does not impede the manufacturing and development process.

According to one embodiment, the mobile processor 12 includes a core 16, such as, but not limited to, an Advanced RISC Machines Ltd. (ARM) core. The ARM core 16 communicates with a cell generally indicated at 18, such as, but not limited to, an EmbeddedICE macrocell. It should be appreciated by those skilled in the art that the description herein as to the first processor 12 being a mobile processor, the second processor 14 being an applications processor, the core 16 being an ARM core, and the cell 18 being an EmbeddedICE macrocell is by way of explanation and not limitation, and that other suitable processors, cores, and cells, respectively, may be implemented in the telematics system 10.

The EmbeddedICE macrocell 18 includes a debug communications data register 20 and a debug communications control register 22, according to a disclosed embodiment. The EmbeddedICE macrocell 18 can be in communication with a Test Access Port (TAP) controller 24, such that the ARM core 16 communicates with the TAP controller 24 through the EmbeddedICE macrocell 18, according to one embodiment. Typically, at least one scan chain is used to communicate between the TAP controller 24 and the debug communications data register 20, and the TAP controller 24 and the debug communications control register 22. The scan chain can support the IEEE 1149.1 Joint Test Action Group (JTAG) architecture, according to a disclosed embodiment.

According to one embodiment, the applications processor 14 communicates with the mobile processor 12 through a plurality of communication channels. Typically, the applications processor 14 communicates with the mobile processor 12 through four communication channels, such that the applications processor 14 communicates with the TAP controller 24. Typically, the applications process 14 is a processor in the telematics system 10 that is capable of supplying the JTAG communications or the like, according to one embodiment. Generally, the JTAG architecture provides an industry-standard debugging bus intended for initial hardware debugging in software development, such that the mobile processor 12 provides at least four dedicated channels or signals for the JTAG bus. The dedicated channels or signals can include, but are not limited to, a Test Clock input (TCK), a Test Mode Select input (TMS), a Test Data Input (TDI), and a Test Data Output (TDO). The four dedicated signals for the JTAG bus implement a synchronous serial bus, according to one embodiment.

Generally, JTAG debugging involves setting break points in the software routine that force the ARM core 16 into a special debugging state. Typically, the debugging state interrupts program execution, which subsequently disrupts normal operation of the telematics system 10. However, the EmbeddedICE macrocell 18 can implement a function, such as a debug communications channel (DCC), which allows normal program execution, while providing a synchronous serial communications channel over the JTAG bus. The debug communications data register 20 and the debug communications control register 22 can be the dedicated DCC registers, according to one embodiment.

One or more software routines that are executed for communication between the mobile processor 12 and the applications processor 14 can be stored in at least one memory device 28. Typically, separate memory devices 28 are in communication with the mobile processor 12 and the applications processor 14. It should be appreciated by those skilled in the art that the at least one memory device 28 can be a separate device from the mobile processor 12 and the applications processor 14, a single memory device 28 can be in communication with the mobile processor 12 and the applications processor 14, that the at least one memory device 28 can be integrated in one or both of the mobile processor 12 and the applications processor 14, each of the mobile processor 12 and the applications processor 14 can include an integrated memory device 28, or a combination thereof.

According to one embodiment, the applications processor 14 accesses the debug communications data register 20 and the debug communications control register 22 through the TAP controller 24 and over a single JTAG scan chain. The scan chain forms a serial shift register that allows the applications processor 14 to read and write to the registers 20,22. The ARM core 16 then accesses the registers 20,22 using the ARM coprocessor read/write instructions. Thus, the JTAG bus can be used for debugging and hardware development during the development and/or manufacturing process, and can be used for synchronous communications between the processors 12,14 during normal operation of the telematics system 10, as described in greater detail herein. Typically, software development and the manufacturing process are conducted before the telematics device 10 is commercially sold and used for normal operation, according to one embodiment.

Figure 2:
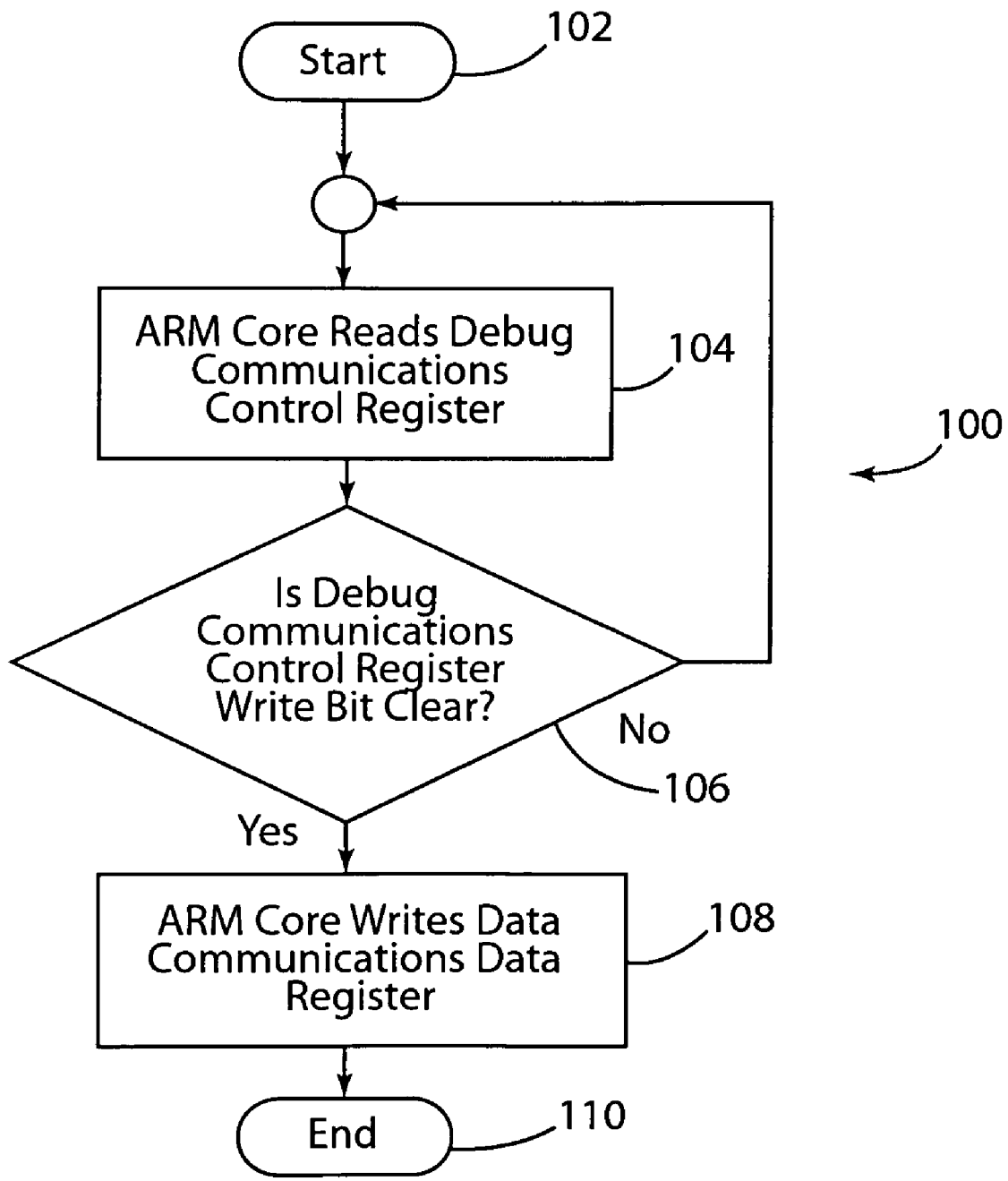
FIG. 2 is a flow chart illustrating a method of transmitting data from a processor of a telematics system, in accordance with one embodiment of the present invention.

In reference to FIGS. 1 and 2, a method of communicating data from the ARM core 16 to the debug communications control register 22 is generally shown, particularly, in FIG. 2 at 100. The method 100 starts at step 102, and proceeds to step 104, wherein the ARM core 16 reads the debug communications control register 22. At decision step 106, it is determined if the debug communications control register 22 first bit or write bit is a predetermined value, such as clear. If it is determined at decision step 106 that the debug communications control register 22 write bit is clear, then the method 100 proceeds to step 108, wherein the ARM core 16 writes data into the debug communications data register 20. According to one embodiment, one bit of the debug communications control register 22 is designated as the write bit, such that if the write bit is clear, the debug communications data register 20 can receive data, and the ARM core 16 can write data to the debug communications data register 20. The method 100 then ends at step 110. However, if it is determined at decision step 106 that the debug communications control register 22 write bit is not clear, then the method 100 proceeds or returns to step 104, wherein the ARM core 16 reads the debug communications control register 22. Thus, the ARM core 16 continuously reads the debug communications control register 22 until the write bit is clear, and the method 100 can proceed to step 108, according to one embodiment. Typically, the one or more executable software routines are executed to command the ARM core 16 at steps 104 and 108, and are executed so that the bit can be analyzed at decision step 106.

Figure 3:
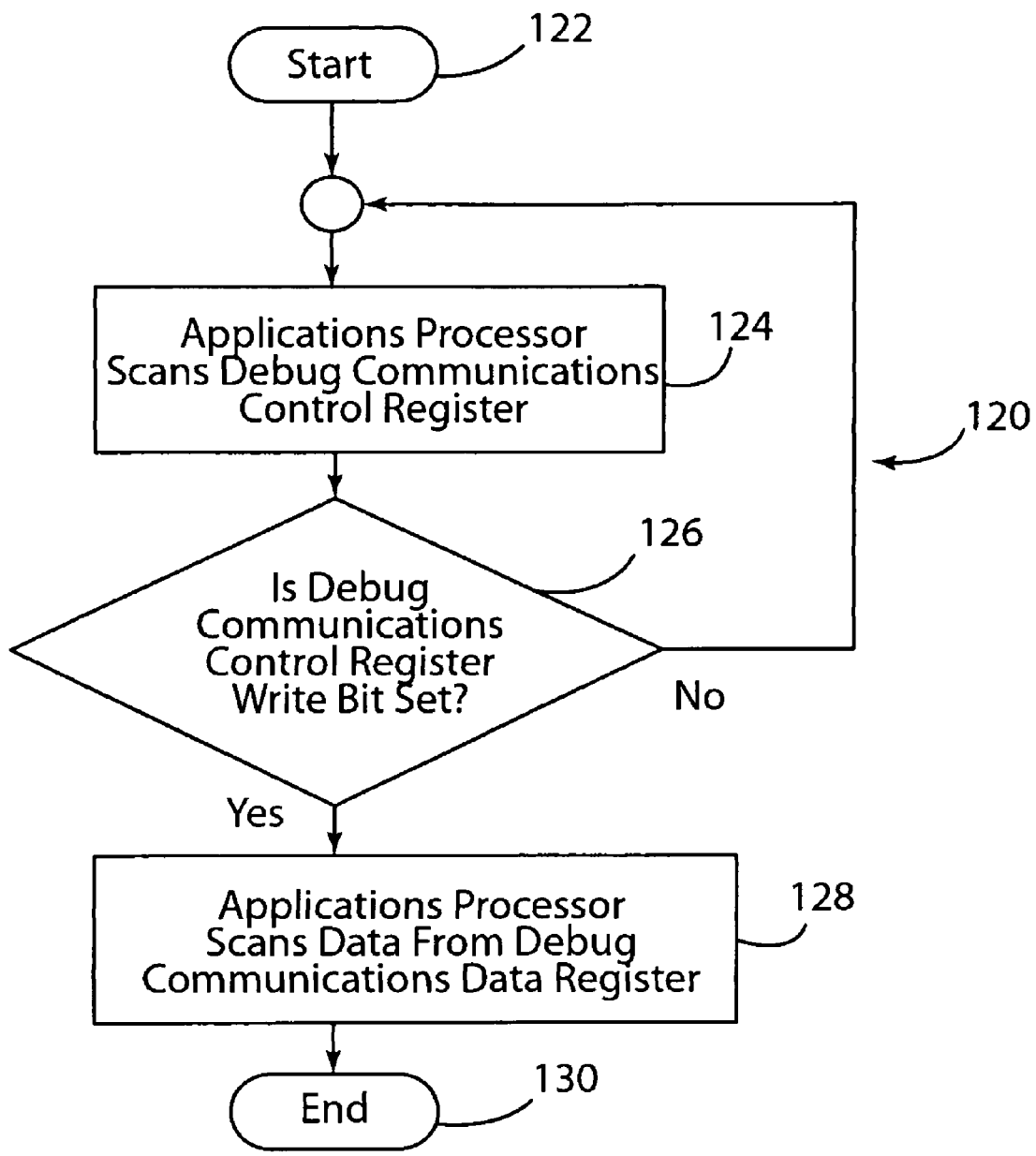
FIG. 3 is a flow chart illustrating a method of receiving data by a processor of a telematics system, in accordance with one embodiment of the present invention.

In reference to FIGS. 1 and 3, a method of receiving data from the applications processor 14 is generally shown, particularly, in FIG. 3 at 120. The method 120 starts at step 122, and proceeds to step 124, wherein the applications processor 14 scans or reads the debug communications control register 22. At decision step 126, it is determined if the debug communications control register 22 write bit is set. If it is determined at decision step 126 that the debug communications control register 22 first bit or write bit is a predetermined value, such as set, then the method 120 proceeds to step 128, wherein the applications processor 14 scans or reads data from the debug communications data register 20. According to one embodiment, one bit of the debug communications control register 22 is designated as a write bit, such that if the write bit is set, the debug communications data register 20 contains data, and the applications processor 14 can read data from the debug communications data register 20. The method 120 then ends at step 130. However, if it is determined at decision step 126 that the debug communications control register 22 write bit is not set, then the method 120 proceeds or returns to step 124, wherein the applications processor 14 scans the debug communications control register 22. Thus, the applications processor 14 continuously scans the debug communications control register 22 until the write bit is set, and the method 120 can proceed to step 128, according to one embodiment. Typically, the one or more executable software routines are executed to command the applications processor 14 at steps 124 and 128, and are executed so that the bit can be analyzed at decision step 126.

Figure 4:
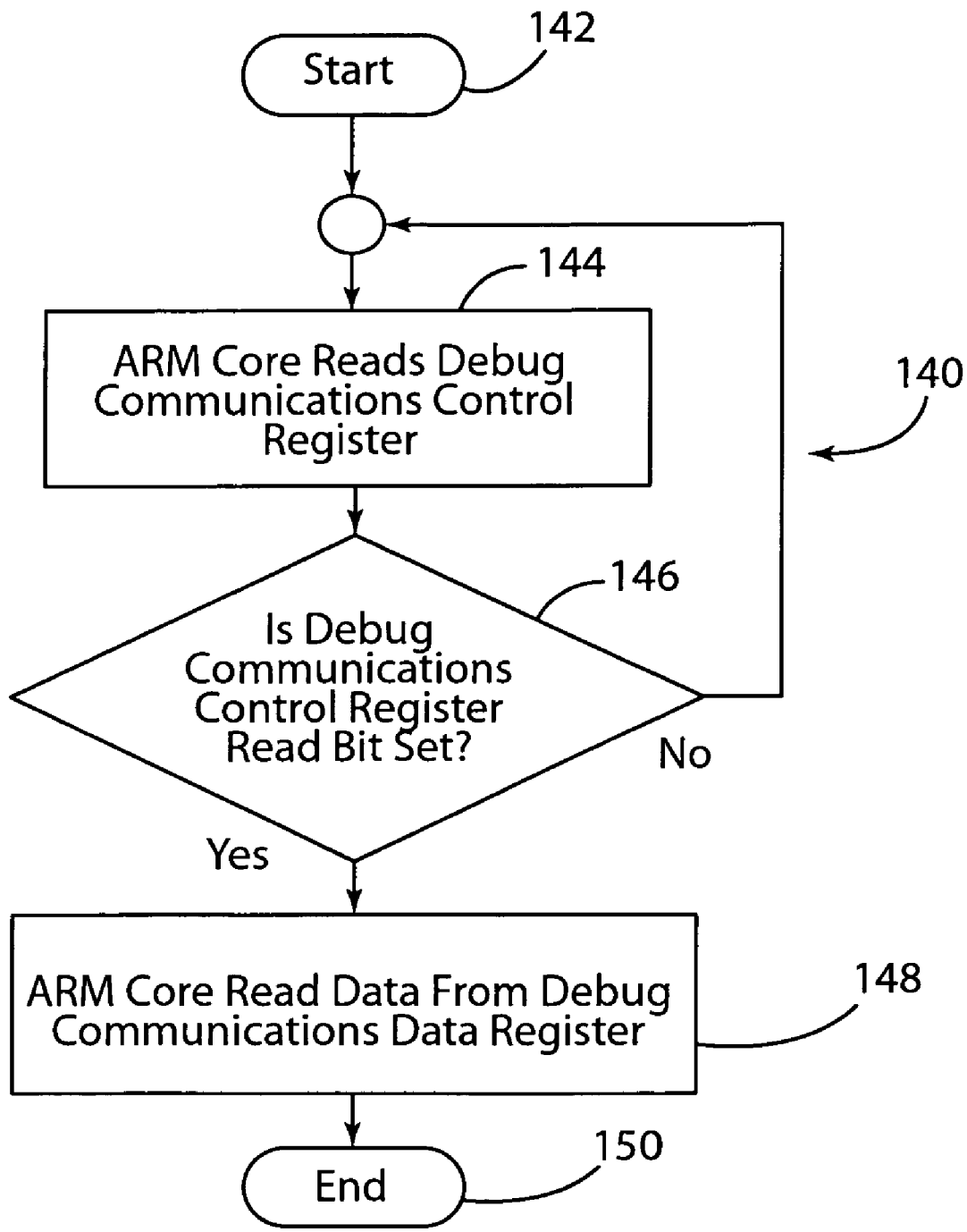
FIG. 4 is a flow chart illustrating a method of receiving data by a processor in a telematics system, in accordance with one embodiment of the present invention.

With regards to FIGS. 1 and 4, a method of receiving data by the ARM core 16 is generally shown, particularly, in FIG. 4 at 140. The method 140 starts at step 142, and proceeds to step 144, wherein the ARM core 16 reads the debug communications control register 22. At decision step 146, it is determined if the debug communications control register 22 second bit or read bit is a predetermined value, such as set. If it is determined at decision step 146 that the debug communications control register 22 read bit is set, then the method 140 proceeds to step 148, wherein the ARM core 16 reads data from the debug communications data register 20. According to one embodiment, the debug communications control register 22 has a designated bit as the read bit, such that if the read bit is set, the debug communications data register 20 contains data, and the ARM core 16 can read or receive the data from the debug communications data register 20. Thus, data transmitted to the debug communications data register 20 by the applications processor 14 is read by the ARM core 16. The method 140 then ends at step 150. However, if it is determined at decision step 146 that the debug communications control register 22 read bit is not set, then the method 140 proceeds or returns to step 144, wherein the ARM core 16 reads the debug communications control register 22. Thus, the ARM core 16 continuously reads the debug communications control register 22 until the debug communications control register 22 read bit is set, and the method 140 can proceed to step 148, according to one embodiment. Typically, the one or more executable software routines are executed to command the ARM core 16 at steps at steps 144 and 148, and are executed so that the bit can be analyzed at decision step 146.

Figure 5:
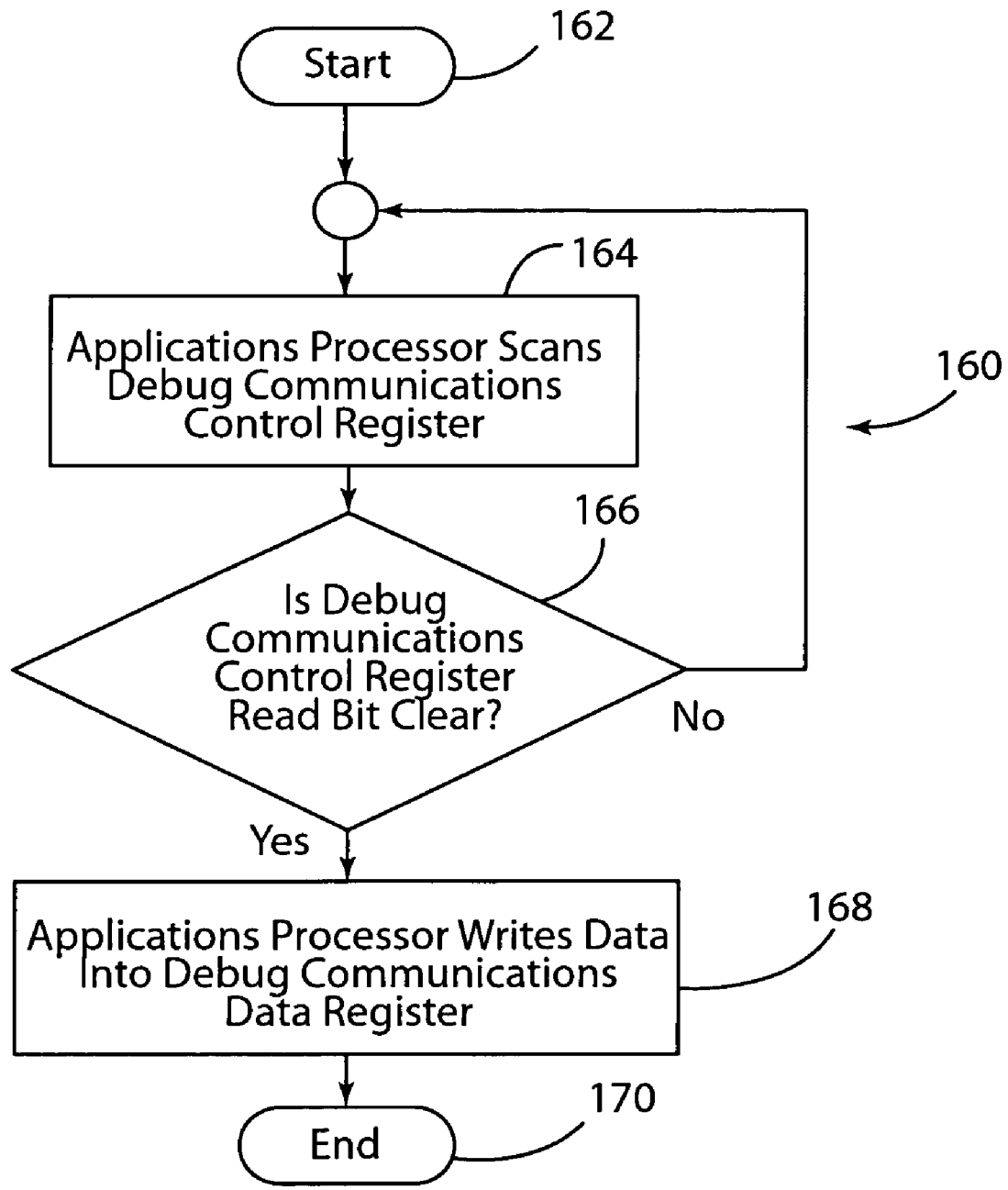
FIG. 5 is a flow chart illustrating a method of transmitting data from a processor of a telematics system, in accordance with one embodiment of the present invention.

In reference to FIGS. 1 and 5, a method for transmitting data by the applications processor 14 is generally shown, particularly, in FIG. 5 at 160. The method 160 starts at step 162, and proceeds to step 164, wherein the applications processor 14 scans the debug communications control register 22. At decision step 166, it is determined if the debug communications control register 22 read bit is clear. If it is determined at decision step 166 that the debug communications control register 22 second bit or read bit is a predetermined value, such as clear, then the method 160 proceeds to step 168, wherein the applications processor 14 writes data into the debug communications data register 20. According to one embodiment, the debug communications control register 22 has a designated read bit, such that if the read bit is clear, the debug communications data register 20 can receive data, and the applications processor 14 can transmit data to the debug communications data register 20. The method 160 then ends at step 170. However, if it is determined at decision step 166 that the debug communications control register 22 read bit is not clear, then the method 160 proceeds to step 164, wherein the applications processor 14 scans the debug communications control register 22. According to one embodiment, the applications processor 14 continuously scans the debug communications control register 22 until the read bit is clear, and the method 160 can proceed to step 168, according to one embodiment. Typically, the one or more executable software routines are executed to command the applications processor 14 at steps 164 and 168, and are executed so that the bit can be analyzed at decision step 166.

By way of explanation and not limitation, in operation and in reference to FIGS. 1-5, the JTAG bus, including the debug communications data register 20, the debug communications control register 22, and the TAP controller 24, can be used for communicating between the mobile processor 12 and the applications processor 14 during normal operation of the telematics system 10. According to one embodiment, the telematics system 10 is used within a vehicle. Thus, data can be transmitted between the mobile processor 12 and applications processor 14, wherein the data includes data typically transmitted between the processors 12,14 during normal operation of the telematics system 10, data for reflashing the mobile processor 12, the like, or a combination thereof. Typically, when reflashing the mobile processor 12, the normal operation of the telematics system 10 is interrupted.

Advantageously, the applications processor 14 can communicate with the mobile processor 12 using the communication channels, which are generally used for the JTAG architecture that provides debugging during the initial hardware and software development and manufacturing process, and are otherwise unused during normal operation of the telematics system 10. Further, by using the JTAG architecture for communication between the mobile processor 12 and applications processor 14, the telematics system 10 provides reliable, high-speed, inter-processor communications, wherein break points do not need to be set in order for the communications to take place, such that the telematics system 10 can continue normal operation. Additionally, the mobile processor 12 can be reflashed using the communication channels, which are otherwise unused after the initial debugging stage, and additional communication channels do not have to be added to the telematics system 10 in order to reflash the mobile processor 12.

The above description is considered that of preferred embodiments only. Modifications of the invention will occur to those skilled in the art and to those who make or use the invention. Therefore, it is understood that the embodiments shown in the drawings and described above are merely for illustrative purposes and not intended to limit the scope of the invention, which is defined by the following claims, as interpreted according to the principles of patent law, including the doctrine of equivalents.

The invention claimed is:
1. A telematics system comprising:
 a mobile processor comprising:
  a core; and
  a cell in communication with said core;
 an applications processor in communication with said mobile processor; and
 at least one communication channel in communication between said mobile processor and said applications processor, wherein said mobile processor and said applications processor communicate data over said at least one communication channel during normal operation of a telematics system, and said mobile processor communicates data over said at least one communication channel when said telematics system is at least one of developed and manufactured, wherein said cell comprises: a debug communications data register configured to store data; and a debug communications control register comprising first and second bits, wherein said data is at least one of written to and read from said debug communications data register based upon a status of at least one of said first and second bits.

2. The telematics system of claim 1, wherein said core writes data to said debug communications data register when said first bit of said debug communications control register is clear.

3. The telematics system of claim 1, wherein said applications processor writes data to said debug communications data register when said second bit of said debug communications control register is clear.

4. The telematics system of claim 1, wherein said core reads data from said debug communications data register when said second bit of said debug communications control register is set.

5. The telematics system of claim 1, wherein the applications processor reads data from the debug communications data register when said first bit of said debug communications control register is set.

6. The telematics system of claim 1, wherein said mobile processor further comprises a test access port (TAP) controller in communication between said cell and said applications processor.

7. The telematics system of claim 6, wherein said at least one communication channel used by said application processor to communicate with said cell through said TAP controller is a JTAG scan chain, wherein said JTAG scan chain is used for debugging and hardware development during at least one of said development and manufacturing of said telematics system, and for synchronous communications between the mobile processor and the applications processor during normal operation of said telematics system.

8. The telematics system of claim 6, wherein dedicated channels of said JTAG bus comprise:
a test clock input (TCK);
a test mode select input (TMS);
a test data input (TDI); and
a test data output (TDO).

9. The telematics system of claim 1, wherein said core is an ARM core.

10. The telematics system of claim 1, wherein said cell is an EmbeddedICE macrocell.

11. A telematics system comprising:
a mobile processor comprising:
an ARM core;
an EmbeddedICE macrocell in communication with said ARM core, wherein said EmbeddedICE macrocell comprises;
a debug communications data register configured to store data; and
a debug communications control register comprising first and second bits, wherein said data is at least one of written to and read from said debug communications data register based upon a status of at least one of said first and second bits; and
a test access port (TAP) controller in communication with said EmbeddedICE macrocell;
an applications processor in communication with said mobile processor; and
a plurality of communication channels in communication between said mobile processor and said applications processor, wherein said mobile processor and said applications processor communicate data over at least a portion of said plurality of communication channels during normal operation of a telematics system, and said mobile processor and said applications processor communicate data over at least a portion of said plurality of communication channels when said telematics system is at least one of developed and manufactured.

12. The telematics system of claim 11, wherein said ARM core writes data to said debug communications data register when said first bit of said debug communications control register is clear.

13. The telematics system of claim 11, wherein said applications processor writes data to said debug communications data register when said second bit of said debug communications control register is clear.

14. The telematics system of claim 11, wherein said ARM core reads data from said debug communications data register when said second bit of said debug communications control register is set.

15. The telematics system of claim 11, wherein the applications processor reads data from the debug communications data register when said first bit of said debug communications control register is set.

16. A method of communicating between processors in a telematics system, said method comprising the steps of:
providing a plurality of communication channels between a first and a second processor for communicating data during normal operation of a telematics system, and communicating debugging data when said telematics system is at least one of developed and manufactured, wherein said first processor comprises a plurality of registers;
writing data to a first register of said plurality of registers by core if a first bit in a second register of said plurality of registers is a predetermined value;
writing data to said first register by said second processor if a second bit of said second register is a predetermined value;
reading data from said first register by said core if said second bit of said second register is a predetermined value; and
reading data from said first register by said second processor if said first bit of said second register is a predetermined value,
wherein said first register is a debug communications data register and said second register is a debug communications control register.

17. The method of claim 16, wherein said first processor is a mobile processor comprising:
an ARM core;
an EmbeddedICE macrocell; and
a TAP controller.

18. The method of claim 16, wherein said second processor is an applications processor.

* * * * *